E. G. KLINE.
WHEEL CONSTRUCTION.
APPLICATION FILED FEB. 11, 1916.
1,192,073.
Patented July 25, 1916.
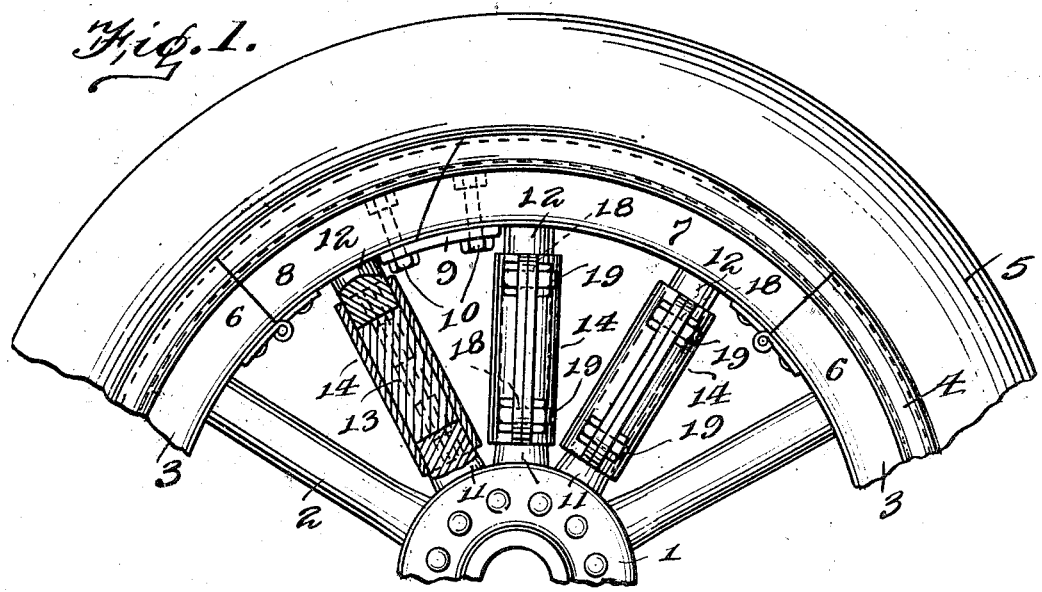
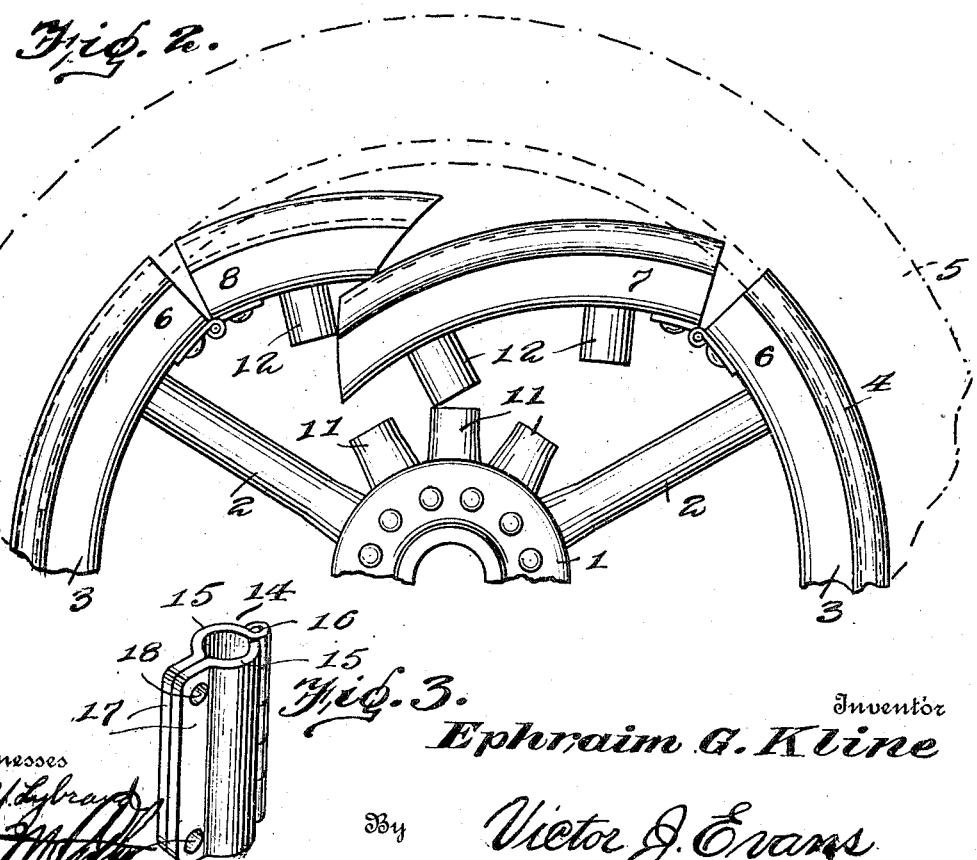
Inventor
Ephraim G. Kline
Witnesses
By Victor J. Evans
Attorney

UNITED STATES PATENT OFFICE.

EPHRAIM G. KLINE, OF MILLERSTOWN, PENNSYLVANIA.

WHEEL CONSTRUCTION.

1,192,073. Specification of Letters Patent. Patented July 25, 1916.

Application filed February 11, 1916. Serial No. 77,677.

*To all whom it may concern:*

Be it known that I, EPHRAIM G. KLINE, a citizen of the United States, residing at Millerstown, in the county of Perry and State of Pennsylvania, have invented new and useful Improvements in Wheel Constructions, of which the following is a specification.

This invention relates to improvements in wheel construction and has particular application to a wheel embodying a sectional felly.

In carrying out the present invention, it is my purpose to provide a wheel which will embody a sectional felly wherein the sections may be collapsed or moved toward the center of the wheel so as to facilitate the application of a tire to the wheel and the removal of the tire from the wheel.

It is also my purpose to provide a wheel of the class described wherein the spokes connected to the movable sections of the felly will embody removable sections so that the lengths of such spokes may be shortened to facilitate the collapsing of the sections of the felly and wherein the removable sections of the spokes may be securely and rigidly held in place when the wheel is intact, thereby preventing accidental collapsing of the felly sections and the consequent removal of the tire from the periphery of the wheel.

With the above and other objects in view, the invention consists in the construction, combination and arrangement of parts hereinafter set forth in, and falling within the scope of, the claims.

In the accompanying drawings: Figure 1 is a fragmentary side elevation of a wheel constructed in accordance with the present invention. Fig. 2 is a similar view of the wheel showing the parts in collapsed position. Fig. 3 is a perspective view of one of the clamps.

Referring now to the drawings in detail, 1 designates a wheel hub, while 2 indicates spokes radiating from the hub 1 and secured to the outer ends of the spokes 2 and disposed concentrically of the hub 1 is a felly 3. In the present instance, I have shown a clencher flange 4 formed on the periphery of the felly 3 to secure a pneumatic tire 5 of the clencher type, although it is to be understood that other tires such, for instance, as cushioned and spring tires, may be applied to the felly of the wheel.

In accordance with my present invention, the felly 3 of the wheel embodies a partially circular integral section 6 which, in the present instance, forms three-fourths of the felly and hinged to one end of the section 6 is a section 7, while hinged to the remaining end of the section 6 is a section 8. The remaining extremities of the sections 7 and 8 are placed end to end and these sections 7 and 8 form the remaining portion of the felly and the meeting ends of the sections 7 and 8 are suitably secured together by means of a connecting plate 9 lying in face to face contact with the inner edges of the sections 7 and 8 and secured to said sections by means of bolts 10 or other fastening devices. In this embodiment of my invention, two of the spokes 2 carry the section 7, while one of the spokes carries the section 8 and each of these spokes comprises inner and outer sections 11 and 12 secured to the hub and the particular section of the felly respectively, and an intermediate removable section 13 placed between the sections 11 and 12 and acting to hold the sections connected to the felly section against inward movement. Surrounding each of said sectional spokes is a clamp 14 which, in this form of my invention, comprises two longitudinal semicircular sections 15 placed edge to edge and having the meeting edges at one side hinged to each other as at 16, and the remaining edges formed with outwardly projecting flanges 17 provided with bolt holes 18 designed to receive securing bolts 19. These clamps surround the respective sectional spokes and act to hold the intermediate sections 13 of such spokes against accidental displacement so as to avoid collapsing of the wheel.

When the sectional spokes are intact and the clamps applied thereto, the sections 7 and 8 of the felly form continuations of the section 6 so as to provide a circular felly that carries the tire.

To remove the tire, it is only necessary to detach the plate 9 from the meeting ends of the sections 7 and 8 and take the bolts 19 from the openings 18. The sections 15 of the clamps 14 may then be swung to open position and the sections 13 of the spokes removed, thereby permitting the sections 7 and 8 to be swung inwardly toward the hub so as to release the tire.

In the present instance, the meeting ends of the sections 7 and 8 are beveled so as to facilitate the inward swinging of such sections upon the taking down of the sectional spokes.

While I have herein shown and described one preferred form of my invention by way of illustration, I wish it to be understood that I do not limit or confine myself to the precise details of construction herein described and delineated, as modification and variation may be made within the scope of the claims and without departing from the spirit of the invention.

I claim:

1. In wheel construction, a hub, spokes radiating from said hub, a felly surrounding said hub and secured to the outer ends of said spokes and embodying a stationary section and movable sections placed end to end and having the other ends thereof hinged to the extremities of said stationary section, said movable sections being capable of inward swinging movement and secured to the outer ends of certain of the spokes, each spoke carrying said movable sections embodying a removable section whereby the movable sections of the felly may be swung inwardly toward the hub when the spoke sections are removed.

2. In wheel construction, a hub, spokes radiating from said hub, a felly surrounding said hub and secured to the outer ends of said spokes and embodying a stationary section and movable sections placed end to end and having the other ends thereof hinged to the extremities of said stationary section, said movable sections being capable of inward swinging movement and secured to the outer ends of certain of the spokes, each spoke carrying said movable sections embodying a removable section whereby the movable sections of the felly may be swung inwardly toward the hub when the spoke sections are removed, and a clamp surrounding each of said sectional spokes to hold the latter intact.

3. In wheel construction, a hub, spokes radiating from said hub, a felly surrounding said hub and secured to the outer ends of said spokes and embodying a stationary section and movable sections placed end to end and having the other ends thereof hinged to the extremities of said stationary section, said movable sections being capable of inward swinging movement and secured to the outer ends of certain of the spokes, each spoke carrying said movable sections embodying a removable section whereby the movable sections of the felly may be swung inwardly toward the hub when the spoke sections are removed, and a two-part clamp surrounding each of said sectional spokes to hold the latter intact and capable of removal from said spokes.

In testimony whereof I affix my signature in presence of two witnesses.

EPHRAIM G. KLINE.

Witnesses:
JAMES ROUNSLEY,
R. H. JEWENS.

Copies of this patent may be obtained for five cents each, by addressing the "Commissioner of Patents, Washington, D. C."